2,249,667

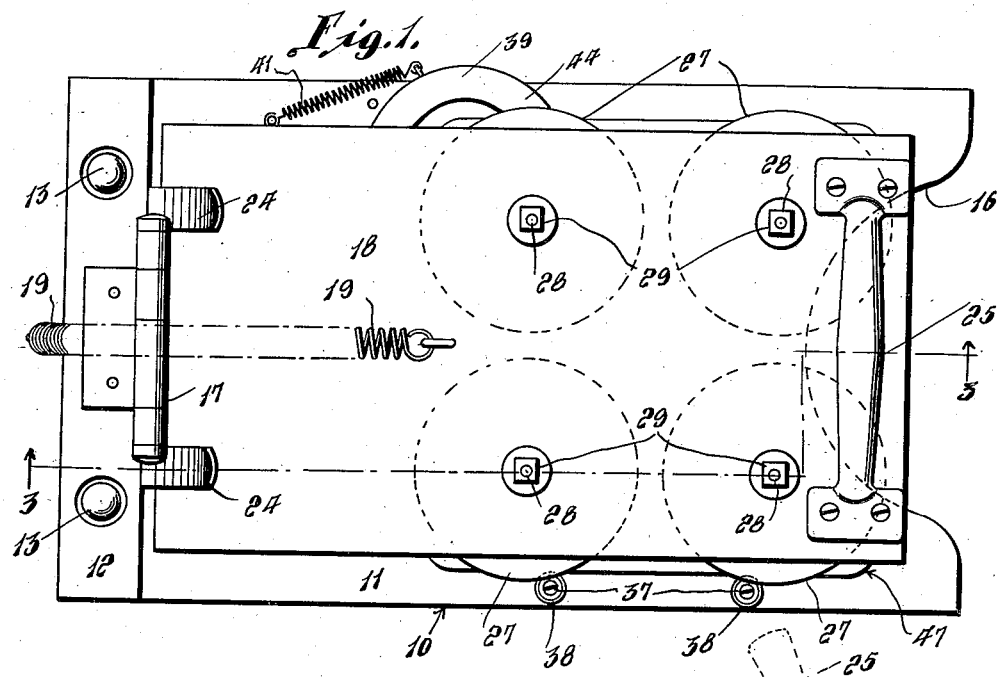
July 15, 1941.  A. RICHARDSON  2,249,667
PIE DOUGH PRESS
Filed Feb. 29, 1940  2 Sheets-Sheet 1
Inventor
Alice Richardson July 15, 1941.   A. RICHARDSON   2,249,667
PIE DOUGH PRESS
Filed Feb. 29, 1940   2 Sheets-Sheet 2
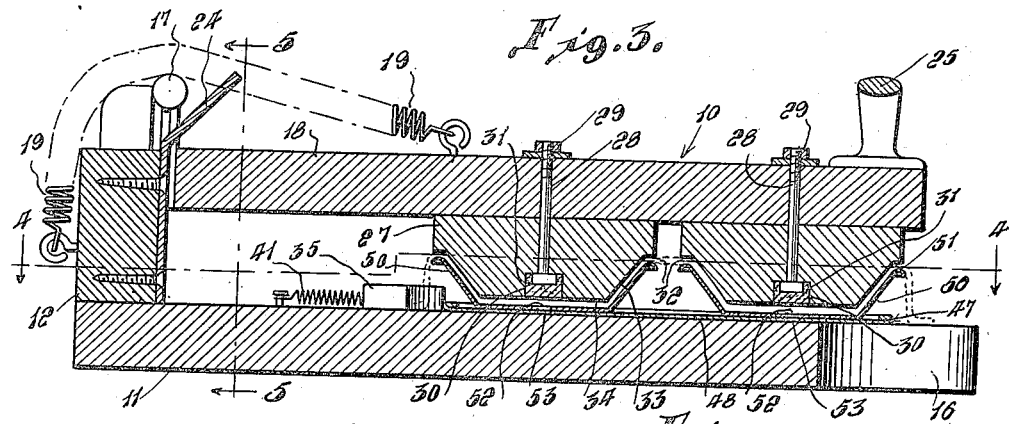
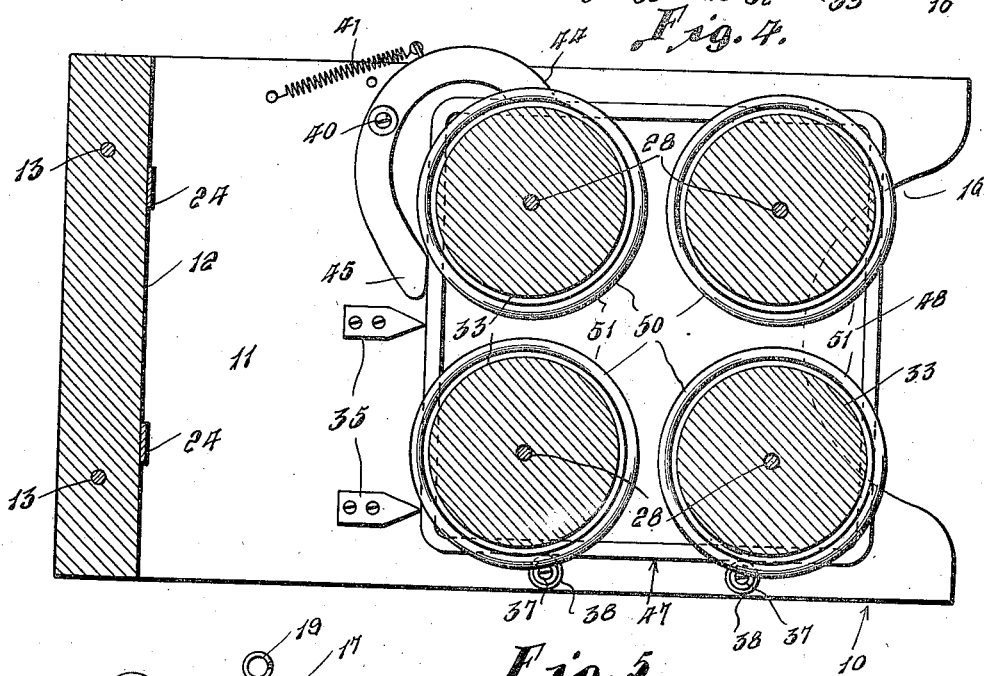
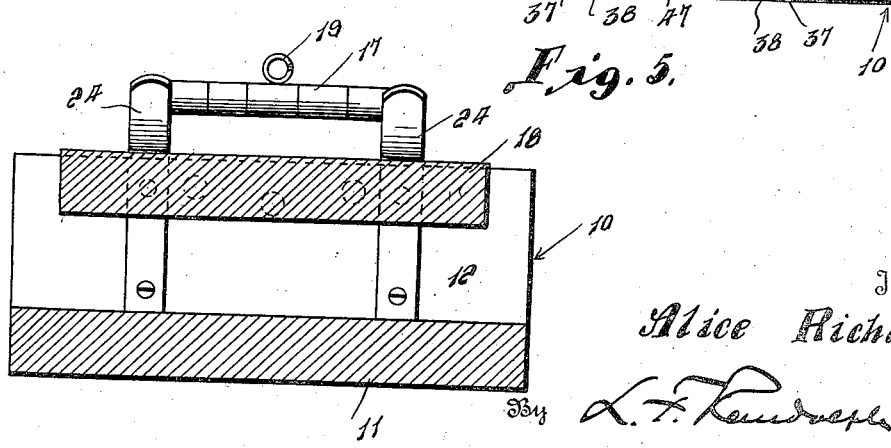
Inventor
Alice Richardson
By L. F. Kendrick
Attorney Patented July 15, 1941

UNITED STATES PATENT OFFICE 2,249,667

PIE DOUGH PRESS

Alice Richardson, Phoenix, Ariz.

Application February 29, 1940, Serial No. 321,576

4 Claims. (Cl. 107—15)

This invention relates to an improved construction of press for forming the bottom layer of dough in a plurality of pie tins, simultaneously, from a sheet of dough disposed over the tins, and is designed and adapted to be used in conjunction with my copending application for patent entitled Pie dough cutter, in simultaneously preparing a plurality of pies for baking.

More particularly, it is an aim of this invention to provide a machine for forming the bottom layer of dough in a plurality of pie tins having means for readily positioning the tins on a base member forming a part of the machine for engagement by a plurality of forms, one of which engages each of the tins for pressing portions of a sheet of dough into the tins to form bottom layers of pies.

Still another aim of the invention is to provide an improved construction of multiple pie tins including a support on which is arranged and secured a plurality of pie tins properly positioned to be engaged by the forms and having vent means for releasing the air from the individual tins as the bottom layer of the pie is formed to prevent the air in the tin from bursting the dough forming the lower layer.

Still another object of the invention is to provide an improved construction of pie press having forms for engaging dough to be pressed into the pie tins formed of a material such as wood or the like to which the dough will not readily adhere.

Other objects and advantages of the invention will hereinafter become more fully apparent from the following description of the drawings, which illustrate a preferred embodiment thereof, and wherein—

Figure 1 is a top plan view of the press in a closed position,

Figure 2 is a side elevational view of the same, showing the hinged cover, in dotted lines, in a partly raised position, Figure 3 is a longitudinal vertical sectional view taken substantially along the plane of the line 3—3 of Figure 1, Figure 4 is a longitudinal horizontal sectional view taken substantially along the plane of the line 4—4 of Figure 3, and Figure 5 is a transverse vertical sectional view taken substantially along the plane of the line 5—5 of Figure 3.

Referring more particularly to the drawings, wherein like reference characters designate like or corresponding parts throughout the different views, 10 designates generally the pie dough press, the construction of most of the parts of which are the same as the corresponding parts in my copending application, heretofore referred to, and these parts will therefore not be described in detail in this application.

The identical parts of the two machines include the base member 11 having the end wall 12 secured thereto by the fastenings 13 which mounts the cover 18 by means of the hinge 17, which cover is normally urged toward a raised position by the contractile coil spring 19, and limited in its upward movement by the stops 24. Cover 18 is provided with an operating handle 25 and the base member 11 is provided with the positioning means including the abutments 35 having the tapered forward ends, the abutment rollers 38 mounted by the posts 37, and the pivotally mounted abutment member 39, which differs from the abutment member 39 of my other application only in that the pivot 40 thereof is disposed substantially intermediate of its ends 44 and 45. The multiple pie tin unit 47 also corresponds to the pie tin unit 47, of my copending application, and includes the four pie tins 50 mounted on the plate 48 and each of which is vented by means of a pair of the registering openings 52 and 53, as best seen in Figure 3, and for a purpose which will hereinafter become apparent.

In lieu of the cutters 27, as shown in my copending application, the pie dough press 10 is provided with four corresponding forms 27 which are secured to the underside of the cover 18, in spaced apart relationship relatively to each other by means of bolts 28 which extend upwardly therethrough and through the cover 18, and which are provided with threaded shank ends for receiving nuts 29 for securely clamping the forms 27 to the underside of the cover 18. The headed ends of the bolts 28 are disposed in recesses 30 formed in the bottom surfaces of the forms 27 which recesses are filled by either a plug or a filler of plastic wood, as indicated at 31 to provide an uninterrupted bottom surface for each of the forms 27.

As best seen in Figure 3, the forms 27 each includes an annular shoulder 32 which faces downwardly and which is disposed above and adjacent to a rim 51 of one of the tins 50 when the cover 18 is in its lowered position, and an annular tapered portion 33 which is disposed within and spaced from the annular outwardly flared side wall of the pie tin. When these parts are in the position, as seen in Figure 3, the bottom surface 34 of the form 27 is spaced from the bottom of the pie tin and it is the width of these spaces that accommodates the dough which forms the bottom layer of a pie, not shown.

The forms 27 are formed of wood or other similar material to which the dough will not adhere so that the forms may be readily removed from the pie tins 50 after the bottom dough layer has been formed.

Spring 19 will normally move the cover 18 to a raised position in abutment with the stops 24 so that a multiple pipe tin unit 47 over which a sheet of dough 55, as seen in dotted lines in Figure 3, has been positioned, may be placed on the upper surfaces of the base member 11 and positioned, as seen in Figure 4, in the manner as described in the previously referred to copending application, in which position it is held by the operator, with one hand. The handle 25 is then grasped to move the cover 18 downwardly to cause each of the forms 27 to engage the dough above one of the tins 50 to force the dough downwardly into the tin and to shape it to the configuration of the tin 50 when the cover 18 has reached the position, as seen in Figure 3. The vents 52 and 53 will provide for the escape of air as the dough is being pressed downwardly into the tins 50 which is important in order that the air will not burst through the sheet of dough 55. The spaces between the different forms 27 and the contiguous portions of the pie tins 50 when the cover 18 is in a fully lowered position are equal to the desired thickness of the lower dough layer and to substantially the thickness of the sheet of dough 55 which is spread over the rims of the pie tins.

It will thus be seen that the bottom layer of dough for four pie tins can be formed simultaneously by the operation of the pie press 10. The pies are completed ready for baking by removing the multiple pie tin unit 47 from the machine 10 after the cover 18 has been permitted to raise by the action of the spring 19, and the recesses in the sheet of dough 55 are then filled with any desired filling, not shown. A second, corresponding sheet of dough, not shown, is then placed over the sheet of dough 55 and the multiple pie unit 47 is then positioned in the pie dough cutter, of my copending application, and the pies are then finished ready for baking, as fully described therein. It will thus be seen that four pies may be prepared quickly and easily for baking saving much time in the preparation and thereby reducing the expense of production. Furthermore, the number of pie tins to the unit 47 may obviously be increased as may likewise be the size of the pie press, to correspond therewith.

Various changes in the construction and arrangement of the parts forming the invention are contemplated and may obviously be resorted to as only a preferred embodiment thereof has been disclosed.

I claim as my invention:

1. A pie dough press comprising a base member for receiving a multiple pie tin, means on said base member for limiting the lengthwise movement of the pie tin in one direction relatively to the base member and for moving it laterally thereof in one direction for directing the multiple pie tin to a certain position relatively thereto, a cover member hingedly connected to the base member, and forms depending from said cover member for engaging portions of a sheet of dough disposed over said multiple pie tin for pressing said portions into the individual tins to form a bottom layer of dough.

2. A device as in claim 1, said means including fixed stops for limiting the longitudinal movement of the multiple pie tin in one direction relatively to said base member, a pivotally mounted abutment member having one end engageable by said multiple pie tin to cause the opposite end thereof to engage and move the multiple pie tin laterally of said base member, and abutment members disposed along one edge of said base member for restricting the lateral movement thereof toward said edge.

3. A pie dough press for use with a plate having a plurality of pie tins fixedly secured to one side thereof in spaced apart relationship relatively to each other, comprising a dough press including a base member, positioning means on the upper side thereof for limiting the lengthwise movement of the pie tins in one direction relatively to the base member and for moving the pie tins laterally thereof in one direction for automatically positioning said pie tins in a predetermined position relatively to the base member when said plate is moved in one direction lengthwise thereof, a cover member hingedly connected relatively to said base member, said cover member being swingable downwardly toward the pie tins, and forms secured to and depending from said cover member and disposed to move into engagement with the pie tins for pressing portions of a layer of dough, disposed over the tins, into each of the tins to form a bottom layer.

4. In a pie dough press, a base member, means on the upper side thereof for automatically positioning a multiple pie tin thereon in a predetermined position, said automatic positioning means including a pivotally mounted abutment member having one end disposed to be engaged by the multiple pie tin unit when it is moved longitudinally of said base member for swinging the opposite end of said abutment member into engagement with a side edge of the multiple pie tin unit for moving the latter laterally of the base member.

ALICE RICHARDSON.